United States Patent
Cheng et al.

(10) Patent No.: US 9,237,347 B2
(45) Date of Patent: Jan. 12, 2016

(54) SYSTEMS AND METHODS FOR VIDEO COMPRESSION FOR LOW BIT RATE AND LOW LATENCY VIDEO COMMUNICATIONS

(75) Inventors: Liang Cheng, Irvine, CA (US); Magda El Zarki, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 2578 days.

(21) Appl. No.: 11/087,080

(22) Filed: Mar. 21, 2005

(65) Prior Publication Data
US 2006/0209964 A1   Sep. 21, 2006

(51) Int. Cl.
*H04N 7/12*   (2006.01)
*H04N 19/107*   (2014.01)
*H04N 19/15*   (2014.01)

(52) U.S. Cl.
CPC .............. *H04N 19/107* (2014.11); *H04N 19/15* (2014.11)

(58) Field of Classification Search
CPC .. H04N 7/50; H04N 7/26271; H04N 7/26244
USPC .............. 375/240.12, 240.16, 240.2; 348/420
See application file for complete search history.

(56) References Cited

U.S. PATENT DOCUMENTS

| | | | |
|---|---|---|---|
| 5,057,916 A * | 10/1991 | Krause et al. | 375/240.12 |
| 5,768,533 A * | 6/1998 | Ran | 709/247 |
| 5,825,425 A * | 10/1998 | Kazui et al. | 375/240.24 |
| 6,081,296 A * | 6/2000 | Fukunaga et al. | 375/240.12 |
| 6,259,736 B1 * | 7/2001 | Chujoh et al. | 375/240.13 |
| 6,611,561 B1 * | 8/2003 | Hannuksela et al. | 375/240.27 |
| 6,633,314 B1 * | 10/2003 | Tuli | 715/744 |
| 6,842,484 B2 * | 1/2005 | Gandhi et al. | 375/240.24 |
| 6,986,158 B1 * | 1/2006 | Terui et al. | 725/116 |
| 6,987,805 B1 * | 1/2006 | Weckel et al. | 375/240 |
| 7,023,572 B2 * | 4/2006 | Tuli | 358/1.15 |
| 7,110,450 B1 * | 9/2006 | Kimoto | 375/240 |
| 7,260,307 B2 * | 8/2007 | Lin et al. | 386/230 |
| 2005/0105615 A1 * | 5/2005 | El-Maleh et al. | 375/240.12 |

(Continued)

OTHER PUBLICATIONS

Haskell et al., *Resynchronization of Motion Compensated Video Affected by ATM Cell Loss*, 1992 International Conference of Acoustics, Speech and Signal Processing, vol. 1, pp. III-545-III-548 (Mar. 23-26, 1992).

(Continued)

*Primary Examiner* — Tung Vo
(74) *Attorney, Agent, or Firm* — One LLP

(57) ABSTRACT

The field of the invention relates to system and methods for video compression, and more particularly to systems and methods for video compression for low bit rate and low latency video communications. In one embodiment, a video communication system includes a first electronic device enabled to receive and display video data and a second electronic device configured to transmit video data to the first electronic device and be communicatively accessible by the first electronic device. The video data includes a plurality of frames, each frame having a plurality of macroblocks. The second electronic device includes a video encoder having a sub-system configured to progressively refresh the macroblocks of the frames in substantially uniform segments, determine whether there are macroblocks encoded with data from an unrefreshed macroblock in the segment last refreshed, and refresh the macroblocks encoded with data from an unrefreshed macroblock in the segment last refreshed.

33 Claims, 7 Drawing Sheets

(56) References Cited

U.S. PATENT DOCUMENTS

2006/0078051 A1* 4/2006 Liang et al. ............. 375/240.24
2006/0104366 A1* 5/2006 Huang et al. ............. 375/240.27

OTHER PUBLICATIONS

Wang et al., *Error Control and Concealment for Video Communication: A Review*, Proceedings of the IEEE, vol. 86, No. 5, pp. 974-997 (May 1998).

Cheng et al., "*Quality Adapted Backlight Scaling (QABS) for Video Streaming to Mobile Handheld Devices*", International Conference on Networking 2005, Reunion, France (Apr. 17-27, 2005), 9 pages.

Cheng et al., "*Perceptual Quality Feedback Based Progressive Frame-Level Refreshing for Robust Video Communication*", IEEE Wireless Communications and Networking Conference 2004 (Atlanta, GA) (Mar. 21-25, 2004), pp. 241-244.

Liu et al., "*Towards Robust AV Conferencing on Next-Generation Neworks*", Multimedia Computing and Networking 2005 (San Jose, CA) (Jan. 19-20, 2005), pp. 1-15.

Cheng et a., "*Perceptual Quality Feedback Based Progressive Frame-Level Refreshing for Robust Video Communication*", IEEE Communications Society, IEEE International Conference on Acoustics, Speech and Signal Processing 2004 (Montreal, Quebec, Canada) (May 17-21, 2004), pp. 2047-2052.

Cheng et al., "*PGOP: An Error Resilient Technique for Low Bit Rate and Low Latency Video Communications*", Picture Coding Symposium 2004 (San Francisco, CA) (Dec. 15-17, 2004), 6 pages.

Article published in the Orange Country Register entitled "*The Future's Here*", Sep. 23, 2003 (4 pages).

* cited by examiner

SYSTEMS AND METHODS FOR VIDEO COMPRESSION FOR LOW BIT RATE AND LOW LATENCY VIDEO COMMUNICATIONS

This invention was made with Government support under Grant No. 0205720, awarded by the National Science Foundation. The Government has certain rights in this invention.

FIELD OF THE INVENTION

The field of the invention relates to system and methods for video compression, and more particularly to systems and methods for video compression for low bit rate and low latency video communications.

BACKGROUND OF THE INVENTION

Transmitting real-time video data over a wireless network is a challenge because wireless networks typically have lower bandwidth and experience high bit error rates due to factors such as long and short fades, shadowing and environmental noise, none of which are conducive to the transmission of time sensitive data, such as real-time video. A common approach to compensate for these factors is to compress the video data, thus reducing the amount of data being transmitted. However, existing compression schemes, such as those defined by the Motion Picture Expert Group (MPEG), tend to aggravate the errors caused by transmission by propagating the errors throughout the video data.

Typical video compression schemes generally involve storing only changes from one video frame to another. These are commonly referred to as predictive video coding schemes, wherein the coding of one frame depends upon information from another. These schemes tend to introduce further data loss at least in part because if errors are introduced into the coding of the first frame, the error propagates to others due to the interdependency between one frame and another. This is generally referred to as "temporal error propagation." This may cause noticeably low quality video frames.

One approach known in the art to stop the propagation of errors is to refresh or intra-code frames, which are referred to as intra-frames ("I-frames") within the video data. An I-frame is a single frame of digital content that is encoded independent of the frames that precede and follow it, i.e., all of the data needed to display that frame by itself is stored. These frames are typically interspersed with inter-frames, also referred to as predictive frames (P-frames), which are the frames that include changes compared to the previous frames and are interdependent between one another. Each I-frame is usually followed by a sequence of P-frames, and the group of frames are collectively known as a group of picture ("GOP"). One GOP is an independent decodable entity.

An advantage of using I-frames is that the propagation of errors terminates at the beginning of each GOP with the I-frame. However, for low-bandwidth (especially wireless) video transmission (e.g. 128 kbit/s) environments, the use of I-frames creates obstacles. Because I-frames are self-contained, I-frames require a larger number of bits for representation, compared to P-frames. This, in turn, may cause a higher delay in transmission. To compensate for this delay, subsequent P-frames are skipped, which may cause "motion jerkiness" in the video. Therefore, in most encoders designed for wireless use, only one I-frame is used at the beginning of the sequence, followed by all P-frames. However, because only one I-frame is used, errors introduced into the data during encoding may propagate throughout the encoding of the P-frames, jeopardizing the fidelity of the decoded video. Thus, some form of data refreshing, i.e., intra-coding, may be required to take place continually to halt the propagation of errors, particularly temporal errors.

Over the past few years, researchers have proposed a variety of approaches to increase the robustness of low bit-rate video communications, such as those described in "Error control and concealment for video communication: A review" by Y. Wang and Q.-F. Zhu, Proc. IEEE, vol. 86, pp. 974-997, May 1998 and "Resynchronization of Motion Compensated Video Affected by ATM Cell Loss" by P. Haskell and D. Messerschmitt, Proc. International Conference of Acoustic, Speech, and Signal Processing, San Francisco, pp. 545-548, March 1992. One approach involves selectively refreshing, or intra-coding, a number of macroblocks ("MBs"), which are essentially blocks of a frame, which can have any size but are often 16×16 pixels in size. Intra-MBs, similar to I-frames, are self-contained blocks of data that do not depend upon information from MBs in other frames. Subsequent MBs may then be inter-MBs, which include only changes from the corresponding MBs in the previous frame video frame. This approach avoids the use and the disadvantages of I-frames; however, some techniques randomly select MBs to intra-code, while others indiscriminately intra-code MBs without any type of error monitoring system. Thus, these techniques tend to still allow the propagation of errors throughout the frames. Accordingly, an improved video compression system is desirable.

SUMMARY OF THE INVENTION

The field of the invention relates to system and methods for video compression, and more particularly to systems and methods for video compression for low bit rate and low latency video communications.

In one embodiment, a video communication system includes a first electronic device enabled to receive and display video data and a second electronic device configured to transmit video data to the first electronic device. The video data includes a plurality of frames, each frame having a plurality of macroblocks. The second electronic device includes a video encoder having a sub-system configured to progressively refresh the macroblocks of the frames in substantially uniform segments, determine whether there are macroblocks encoded with data from an unrefreshed macroblock in the segment last refreshed, and refresh the macroblocks encoded with data from an unrefreshed macroblock in the segment last refreshed.

In another embodiment, a method for refreshing a set of video data having a plurality of frames, wherein each frame having a plurality of macroblocks, includes the steps of progressively refreshing the macroblocks of the frames in substantially uniform segments, determining whether there are macroblocks encoded with data from an unrefreshed macroblock in the segment last refreshed, and refreshing the macroblocks encoded with data from an unrefreshed macroblock in the segment last refreshed.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION OF THE PREFERRED EMBODIMENTS

Figure 1A:
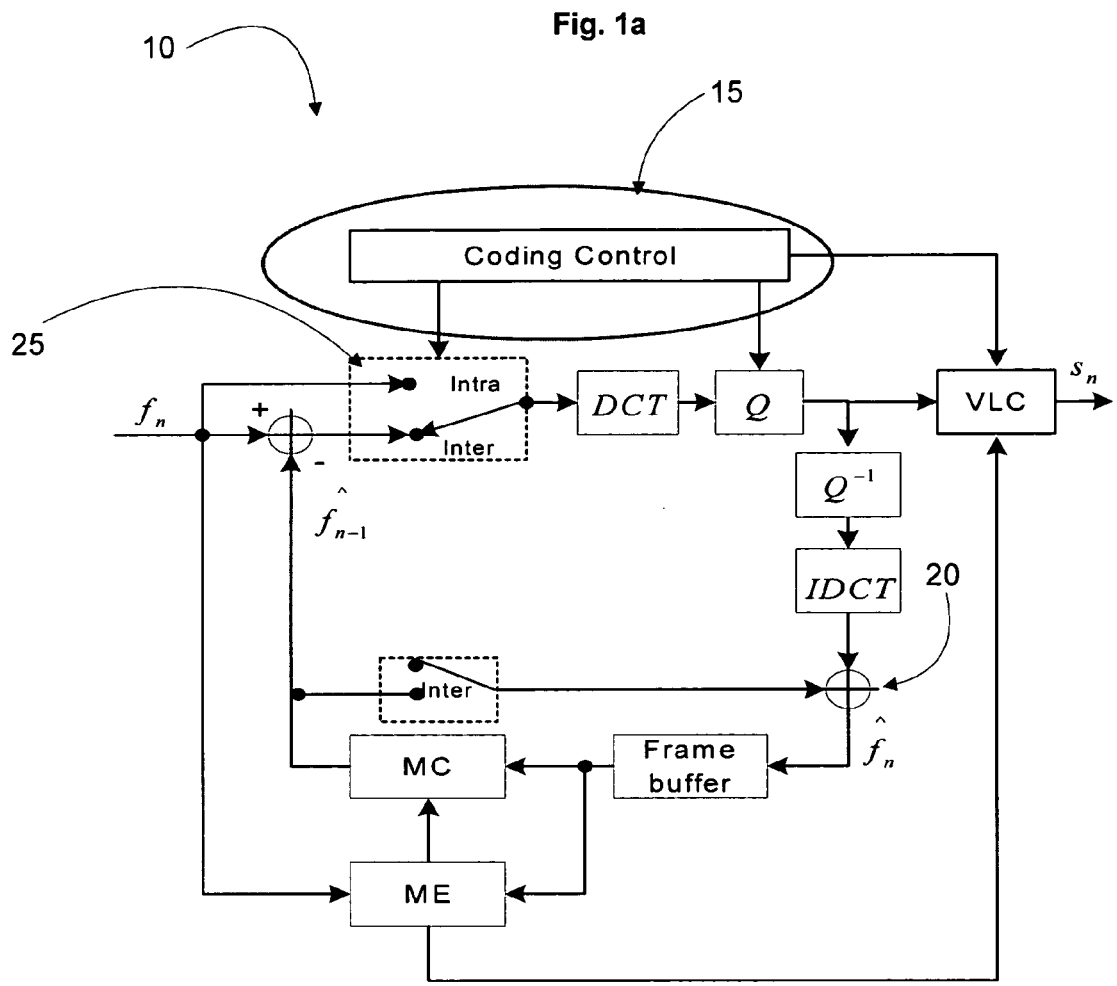
FIGS. 1a and 1b are diagrams of a system in accordance with a preferred embodiment of the present invention.
Figure 1B:
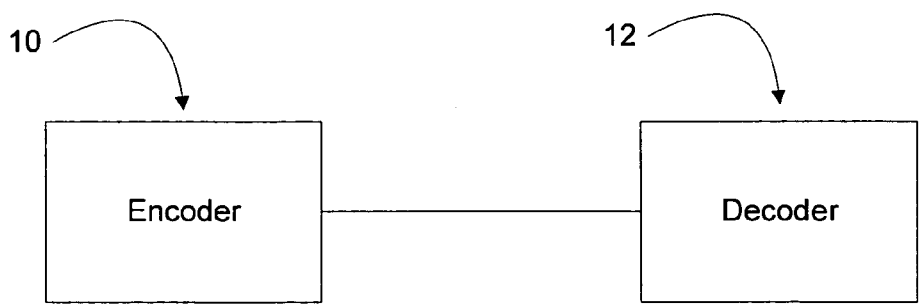

As mentioned above, it is desirable to provide an error resilient video encoding system that does not substantially effect the performance of video communications—a system that stops the temporal propagation of errors introduced into video data in a controllable and systematic manner. Such a system can be included in a video encoder known in the art. An example encoder circuit 10 is shown in FIGS. 1a and 1b, accessible by a decoder 12, as shown in FIG. 1b. The decoder 12 may be an industry standard decoder using existing decoding methods, as one of ordinary skill in the art would appreciate. The components of a video encoder 10 are generally known in the art and are briefly described herein. In the illustrated example, the encoder 10 includes a discrete cosine transfer component ("DCT") coupled to a quantization component ("Q"), which is coupled to both a variable length coding component ("VLC") and an inverted quantization component ("$Q^{-1}$"). The inverted quantization component $Q^{-1}$ is coupled to an inverted discrete transfer component ("IDCT"). The IDCT is coupled to a motion compensator ("MC") and a motion estimator ("ME") via a signal mixer 20 and a frame buffer. The encoder 10 is generally managed by a coding control module 15. During operation, the encoder 10 receives a set of video data frame-by-frame, $f_n$. The frame $f_n$ is received by a switch 25 controlled by the coding control module 15 that determines whether to inter-code or intra-code the frame $f_n$. Frames to be inter-coded, i.e., encoded into P-frames, are based on data in the previous frame, $f_{n-1}$, as described above. The coding control module 15 preferably includes a video refreshing system that employs a technique referred to as the progressive group of picture ("PGOP") technique.

Figure 2:
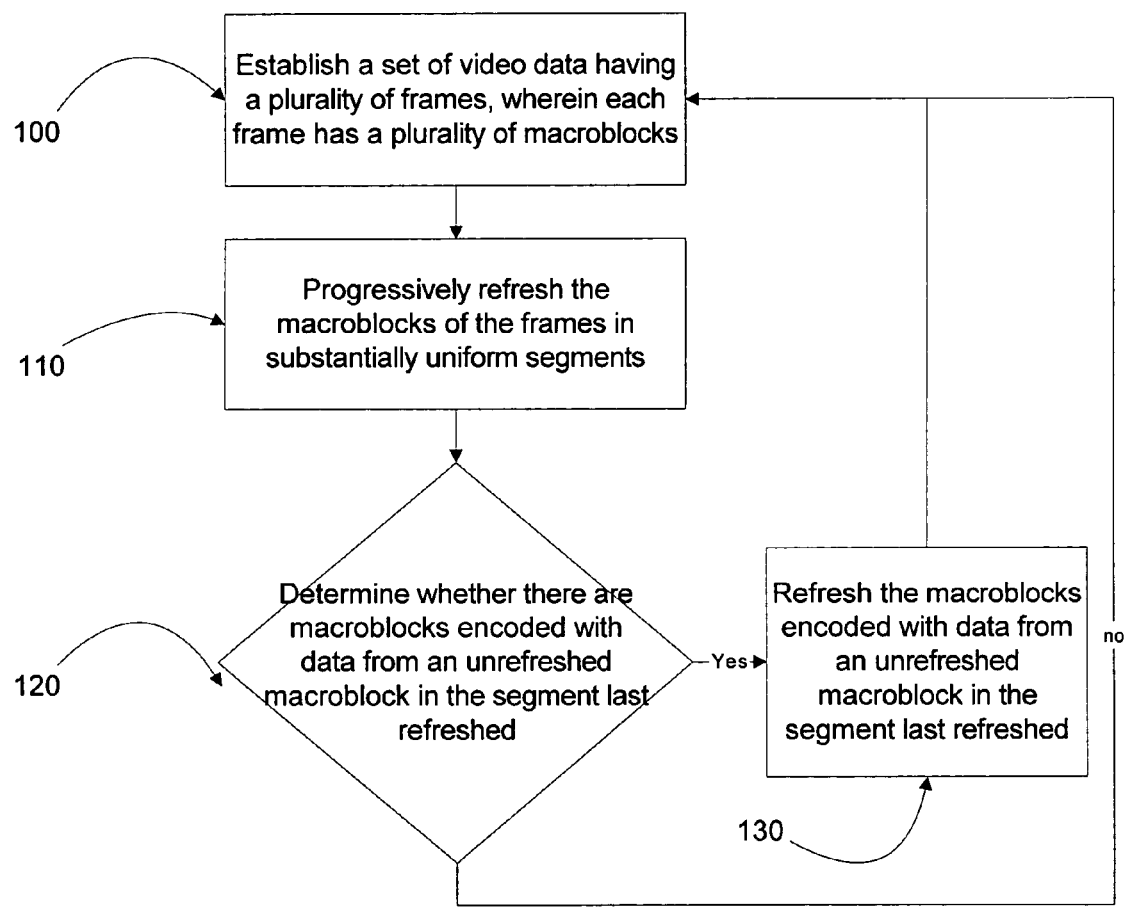
FIG. 2 is a flowchart of the operation of a system in accordance with a preferred embodiment of the present invention.

The operation of the video refreshing system is shown in FIG. 2. For a set of video data, which is established having a plurality of frames, wherein each frame has a plurality of macroblocks (action block 100), the video refreshing system progressively refreshes, or intra-codes, the macroblocks of the frames in substantially uniform segments (action block 110). The objective is to progressively refresh substantially all of the macroblocks in the set. However, as will be illustrated below, after a macroblock in one frame has been refreshed, the corresponding macroblock in the subsequent frame may have been encoded with data from an unrefreshed macroblock, and thus, propagated error may have been introduced. The system addresses this by checking the segment last refreshed to determine whether there are macroblocks encoded with data from an unrefreshed macroblock (decision block 120). If so, then the system will refresh the macroblocks encoded with data from an unrefreshed macroblock in the segment last refreshed (action block 130). This function, referred to as stride back, can be achieved through the use of motion vectors, as will be illustrated below.

Figure 3:
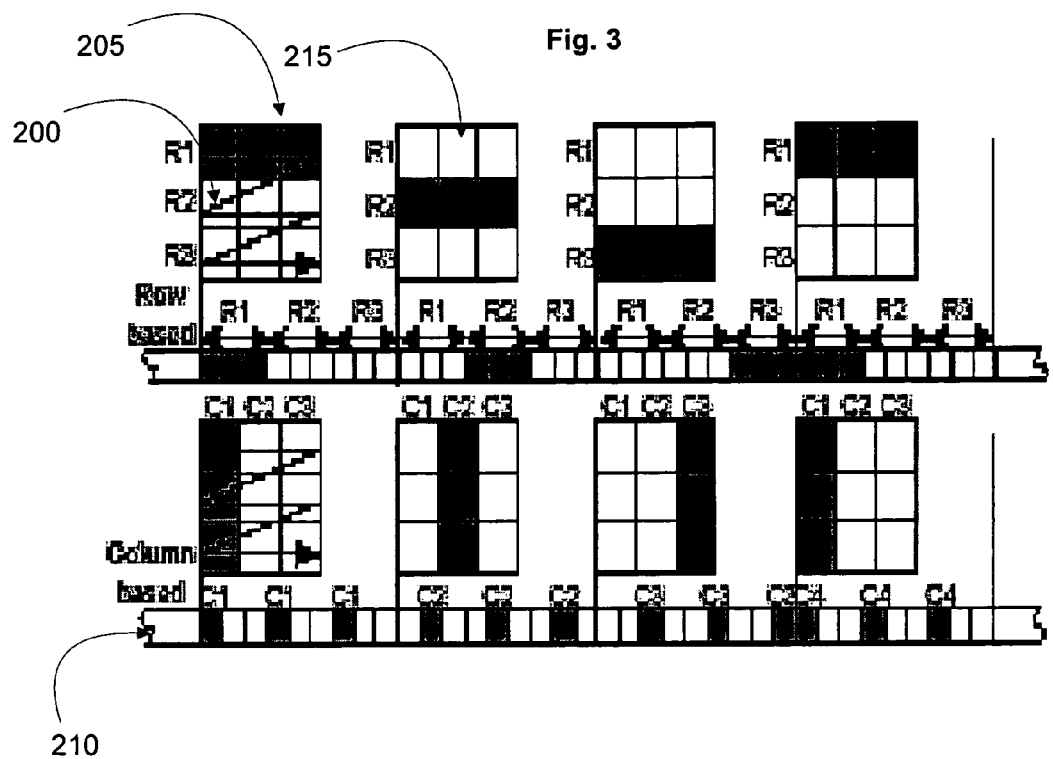
FIG. 3 is an illustration of the operation of the system in accordance with a preferred embodiment of the present invention.
Figure 4:
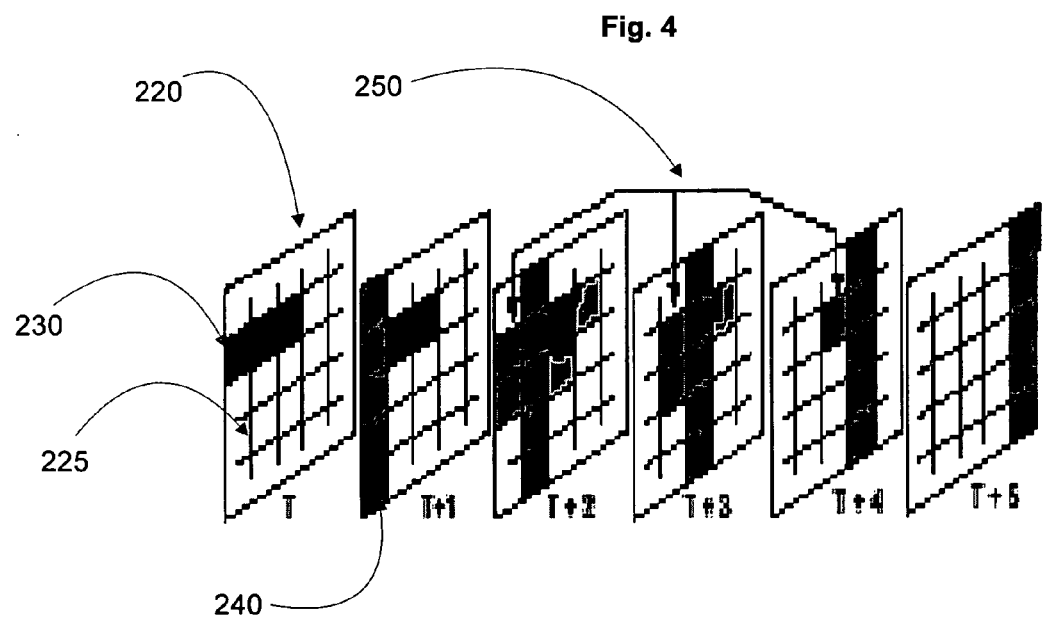
FIG. 4 is another illustration of the operation of the system in accordance with a preferred embodiment of the present invention.
Figure 5:
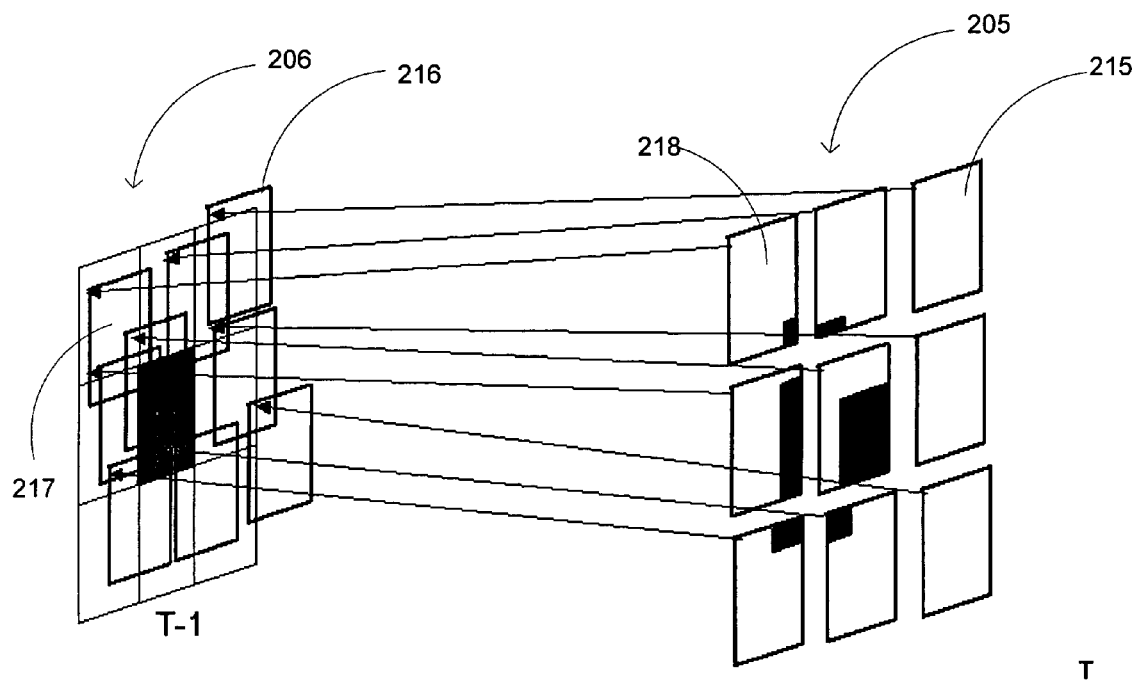
FIG. 5 is another illustration of the operation of the system in accordance with a preferred embodiment of the present invention.

An example of the operation of the video refreshing system is illustrated in FIGS. 3, 4, and 5. Turning to FIG. 3, a representation of two sets of video data is shown, each having four video frames 205, wherein each video frame 205 has nine macroblocks 215 (action block 100). During operation, the coding control module 15 progressively refreshes the macroblocks 215 of the frames 205 in substantially uniform segments (action block 110). The top set of video data shows the segments as rows, and thus, the system refreshes the macroblocks 215 incrementally row-by-row, from top to bottom (the shaded macroblocks 215 represents macroblocks being refreshed). The refreshing process is progressive, i.e., the next row to be refreshed is the next row of the next frame.

The bottom set of video data in FIG. 3 shows the segments as columns, and thus, the coding control module 15 refreshes the macroblocks 215 incrementally column-by-column, from left to right. Again, the refreshing process is progressive, i.e., the next column refreshed is the next column of the next frame, as illustrated by the shaded macroblocks 215. In a preferred embodiment, the refreshing segments are column based, and are refreshed preferably from left to right. The industry standard encoding systems scan video frames from left to right, top to bottom, as shown by the zig-zag arrows 200. If the macroblocks 215 were mapped out in sequential order as is shown below each set of video data 210, the column based approach, as compared to the row based approach, refreshes macroblocks 215 in a more evenly distributed manner. Evenly distributed refreshed macroblocks 215 effectively help the rate control mechanism to balance the bit rate budget in conjunction with the encoding quality, thereby enhancing the encoding video quality.

As mentioned above, except for the first frame of a set of video data, each frame is established based on changes from the previous frame. Most changes involve spatial movements of common visual data. Thus, each macroblock of a frame can have a corresponding matching area in the previous frame, i.e., an area that is substantially similar, but in a different spatial location. This is illustrated in FIG. 5. A video frame 205 is shown at time T having nine macroblocks 215. The previous video frame 206 at time T−1 is shown in comparison, highlighting the matching areas 216 corresponding to the macroblocks 215 of the video frame 205 at time T. The matching areas 216 are substantially similar but at different spatial locations. Some of the matching areas 216 overlap into different macroblocks, e.g., the matching area at 217 overlaps into the shaded macroblock in the middle of video frame 206 at time T−1. Thus, the macroblock at 218 in video frame 205 is encoded partially with data from the shaded macroblock in the middle of video frame 206 at time T−1.

The macroblocks 215 in the video frame 205 at time T can be encoded after PGOP is applied in the previous video frame 206 at T−1. For example, if the first column of macroblocks in video frame 206 at T−1 is refreshed, the second column may not be. In such a case, the macroblock 218 in the first column of video frame 205 can be encoded with data from an unrefreshed macroblock, e.g., the shaded macroblock in video frame 206 at T−1, even though the first column was refreshed. As explained above, the data from the unrefreshed macroblock can include propagated temporal errors. To address this problem preferably, a stride back function is employed, which analyzes the column corresponding to the column last refreshed to determine whether unrefreshed data was introduced into the macroblocks of the column last refreshed. If so, then those macroblocks are refreshed to halt the propagation of any temporal errors introduced from the unrefreshed data.

In one embodiment, the stride back function utilizes motion vectors. Generally, motion vectors describe the location difference from an MB 217 of one frame 205 to a corresponding matching area 216 in the previous frame 206. Thus, motion vectors can be used to calculate the spatial location of the matching areas 216, typically in the form of (x,y) coordinates, of the previous video frame, e.g., video frame 206 at time T−1. The motion vectors can help to indicate whether the matching areas 216 overlap unrefreshed areas of the video frame. As is known in the art, in encoder 10, the motion estimator, ME, shown in FIG. 1a, calculates the motion vectors for the previous frame. The stride back function utilizes the motion vectors to determine the range of temporal errors potentially propagated within the unrefreshed data.

Turning to FIG. 4, the stride back function 250 is illustrated. A set of video data is shown having six video frames, each frame having twenty-five macroblocks 225. The macroblocks 225 are refreshed column-by-column. The black macroblocks 230 are macroblocks with unrefreshed data. The first column of the second frame is refreshed at time T+1, as shown by the shaded macroblocks 240. At time=T+2, the refreshing process progressively migrates to the second column of the third frame. At this time, in accordance with stride back function, the coding control module 15 determines whether the first column of the third frame has any macroblocks with unrefreshed data (decision block 120). If so, then those macroblocks with unrefreshed data 230 are preferably refreshed (action block 130). In the alternative, the entire column can be refreshed. The process continues at each increment of time until the last column is refreshed at time=T+5. At each time increment after time=T+1, the column last refreshed is checked for macroblocks with unrefreshed data 230. The result is a substantially error free set of video data without the use of I-frames.

One aspect of this technique that must be considered is the interval of the PGOP, $M_b$, i.e., the duration of time between the first and last column refreshed. This is determined by the refresh interval, i.e., how many frames include at least one intra-coded MB, and the refresh column number, i.e., how many columns are regularly refreshed for one frame. Thus, the period of PGOP, $M_b$, can be described as:

$$M_b = N_c \times T/N_r \quad (1)$$

where ($N_c$ is the total number of macroblock columns in one frame, T is the time between two frames being column refreshed, and $N_r$ is the number of columns being regularly refreshed in one frame.

PGOP is preferably applied to the MPEG-4 baseline encoder but can be applied to any predictive encoding scheme, including the H.261, 3, and 4 and the MPEG-1, 2, and 4 series of encoders. In the case where the refresh interval is greater than one, a bitmap table can be utilized to keep the status of every pixel. For one MB of 256 pixels, 32 bytes is needed. Each bit represents the status of one pixel, i.e., if that pixel is affected or not. Those MBs that have at least one pixel marked as having unrefreshed data will be marked for refreshing. For a QCIF video, a total of 3168 bytes, i.e., 32×99, extra memory is used at the encoder. If half-pixel motion estimation, known in the art, is used, some extra pixel interpolation operations are done. If the refresh interval is one, then no extra memory is required because the propagating errors can be substantially eliminated.

After the application of a basic PGOP, errors that might exist in the motion compensation loop are substantially "refreshed". Hence, if channel loss happens when the $i^{th}$ (0≤i≤total number of columns refreshed in one frame) column is being refreshed, the refreshing time is bound by $M_u$, which is the time for refreshing the rest of the frame in the current PGOP plus the next PGOP, i.e. $(2 \times N_c - i) \times T/N_r$. Thus, there is an absolute bound to the interval, which is $2(M_b)$. These factors may be adjusted to maximize quality and performance of the video data being encoded. For example, the bit rate fluctuation can be adjusted by adjusting the length of the PGOP period, i.e., decrease the number of intra-coded MBs per frame.

Figure 6:
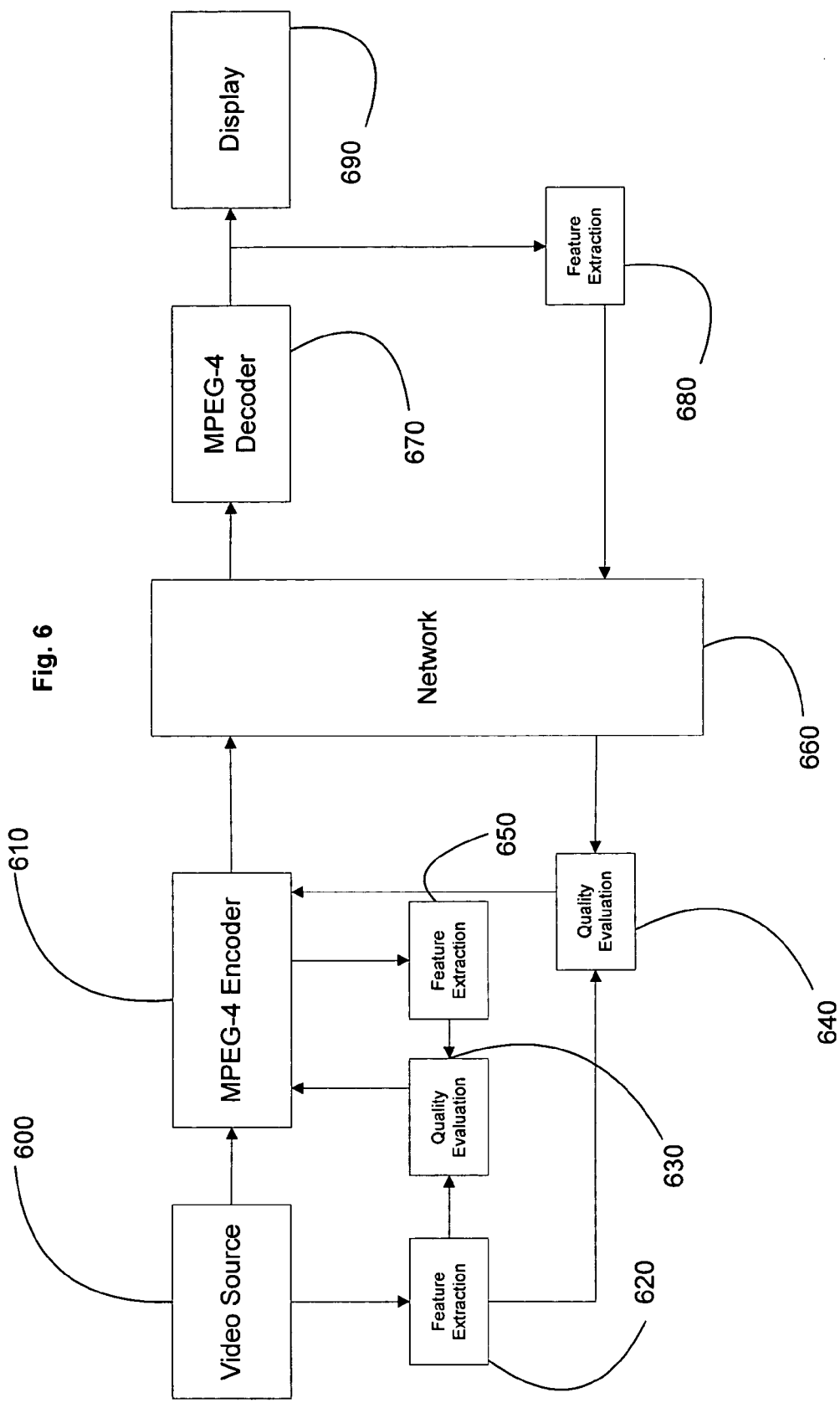
FIG. 6 is a diagram of a system in accordance with a preferred embodiment of the present invention.

The PGOP can be utilized in a feedback system. An example of such a feedback system is shown in FIG. 6. The feedback system includes an MPEG encoder 610 coupled to a video source 600. The PGOP system is included in the MPEG encoder 610. The MPEG encoder 610 receives data not only from the video source 600, but also from a quality evaluation component 630 coupled to a feature extraction component 620 coupled to the video source 600 and a feature extraction component 650 coupled to the MPEG encoder 610. The MPEG encoder 610 outputs encoded video data to be received by an MPEG decoder 670 via a network 660, which provides data to a display 690. The MPEG decoder 670 further provides data to a feature extraction component 680 which is fed back, via the network 660, to a quality evaluation component 640 coupled to the MPEG encoder 610.

One particular system that the PGOP can be incorporated into is a perceptual quality feedback framework. A major difference between the quality feedback and the conventional feedback types, e.g., packet loss rate, is that the quality feedback reflects the distortion caused by the channel loss in a cumulative way. This can effectively solve the drawbacks, such as feedback delay and loss, that can be inevitable in other channel-layer feedback based systems because the quality feedback does not rely on the current channel status, which may not be "current" when the channel status is received by the encoder. Instead, the received quality feedback shows the quality distortion jointly determined by the losses before it, even if the feedback is received late or its previous feedbacks, if any, are lost.

The Institute for Telecommunications Sciences ("ITS") developed a spatial-temporal distortion metrics. Instead of using pixel-comparison, the ITS model based quality assessment algorithm calculates the quality features of processed spatial-temporal ("S-T") regions. Thus it is suitable for in-service digital video quality monitoring. In the current implementation, the quality features of the decoded video are extracted, sent back to the encoder, and compared to the features of the encoder side reconstructed video, as illustrated in FIG. 6. Once the encoder realizes any inconsistencies, which indicates the occurrence of channel loss, the encoder will send one PGOP to quickly remove the errors jointly caused by all previous channel losses and propagation effects thereof. For substantially error free periods, nevertheless, the highest possible coding efficiency can be preserved as no MBs will be force-updated.

The quality feature feedback rate can be extraordinarily low. For example, for quarter-common-interchangeable-format (QCIF) video, the feedback rate is only 15.47 kbit/s with a 6-frame feedback interval. The complexity of the quality feature extraction is highly scalable because the feedback interval is adjustable and the quality feature can be spatially sampled. And thus, the feedback rate can be further lowered. There is a tradeoff between the error recovery capability, i.e., PGOP period and the bit rate fluctuation. On the one hand, it is desirable to set the PGOP period as short as possible. I-frame is an extreme instantiation: I-frame has the maximum error recovery capability because it can stop error propagation within one frame. On the other hand, the bit rate fluctuation can be lowered if the length of PGOP is increased, i.e., decrease the number of intra-MBs of each frame. When the PGOP is sporadically inserted into the compressed stream, the bit rate fluctuation can happen due to the mismatch of the quantization scale and the percentage of intra-MBs in the first frame of the PGOP. The percentage of the intra-MBs in the first frame of the PGOP is usually larger than its previous frames, which are regular P-frames. The rate control mechanism may not be able to increase the quantization scale promptly to compensate for the higher number of bits generated by the refreshed MBs. After the first frame of the PGOP, the rate control mechanism can adapt to the large intra-MBs percentage of the remaining frames, which can have slightly more intra-MBs than the first frame due to stride back function. The bit rate will converge quickly to the desired value.

Therefore, the number of intra-MBs of each frame in the PGOP is determined, which can maximally expedite the frame-level refresh period and keep the output bit rate fluctuation within a designated range. The process to minimize the impact of PGOP on the bit rate fluctuation is herein described. The following parameters are defined:

| | |
|---|---|
| $Q_{pre}$ | average quantization scale of previous frame |
| R | bit rate of the video sequence |
| F | frame rate of the video sequence |
| M | total number of MBs in one frame |
| C | total number of MB-columns in one frame |
| α | percentage that the bit number can exceed the average bit allocation |
| β | percentage of intra-MBs for the first frame of PGOP |
| $Col_{PGOP}$ | maximum number of intra-columns for the first frame of PGOP |

The linear relation between the percentage of intra-MBs and the bit number is described as:

$$Bits = a \times \beta + b, \qquad (2)$$

where b represents the number of bits for a predictive frame with zero intra-MB percentage. Then (a+b) represents the number of bits for a predictive frame with 100% intra-MB percentage, i.e., $\beta=1$.

One of ordinary skill in the art would appreciate that the number of bits in a frame with a certain percentage of intra-MBs relies on the quantization scale. Instead of using rate-quantization (R-Q) models, an online algorithm is designed to determine the values of a and b by pre-coding the current frame once with 0% intra-MBs and once with 100% intra-MBs. $Q_{pre}$ is used for all the MBs in the current frame.

Figure 7:
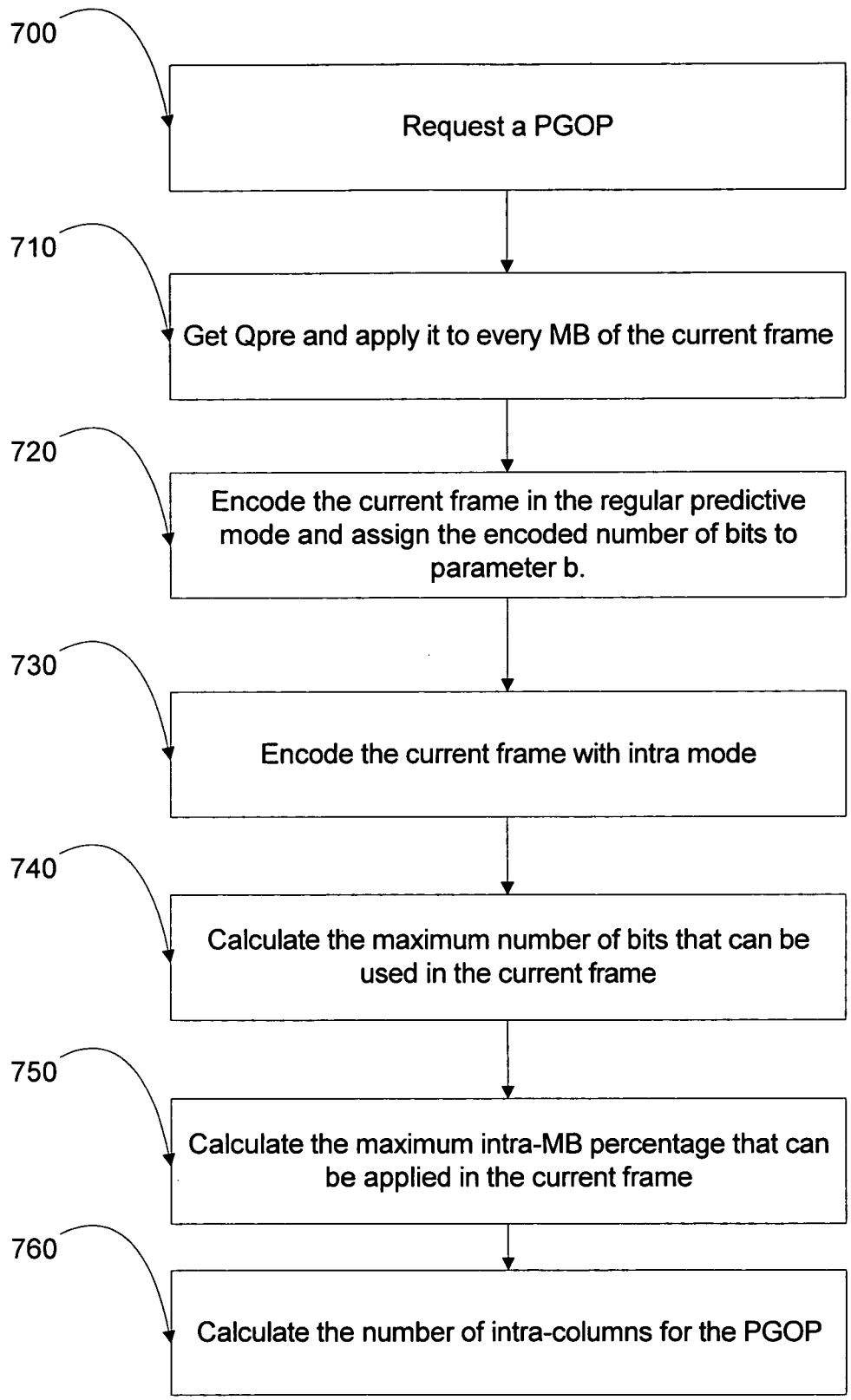
FIG. 7 is a flowchart of the operation of a system in accordance with a preferred embodiment of the present invention.

Turning to FIG. 7, the process is illustrated. The last quality feedback shows that channel loss has occurred and one PGOP is requested (action block 700). Then, the $Q_{pre}$ is obtained and applied to every MB of the current frame, i.e., first frame of PGOP (action block 710). Then, the current frame is encoded in the regular predictive mode and the encoded number of bits is assigned to parameter b (action block 720). Next, the current frame with intra mode is encoded, and the encoded number of bits is assigned to (a+b) to obtain the linear relationship denoted by Eq. 1 (action block 730). Next, the maximum number of bits (including the fluctuation range) that can be used in the current frame is calculated (action block 740), which is:

$$Bits = (R/F) \times (1+\alpha) \qquad (3)$$

The maximum intra-MB percentage that can be applied in the current frame is then calculated (action block 750) by using Eq. 2 and Eq. 3:

$$(R/F) \times (1+\alpha) = (a \times \beta) + b,$$

from which we get $$\beta = ((1+\alpha) \times (R/F) - b)/a \qquad (4)$$

Finally, the number of intra-columns for the PGOP is calculated (action block 760):

$$Col_{pgop} = M \times \beta / C \qquad (5)$$

wherein the result is rounded to the lowest integer. If $Col_{pgop}$ is negative, set it to zero.

Figure 8:
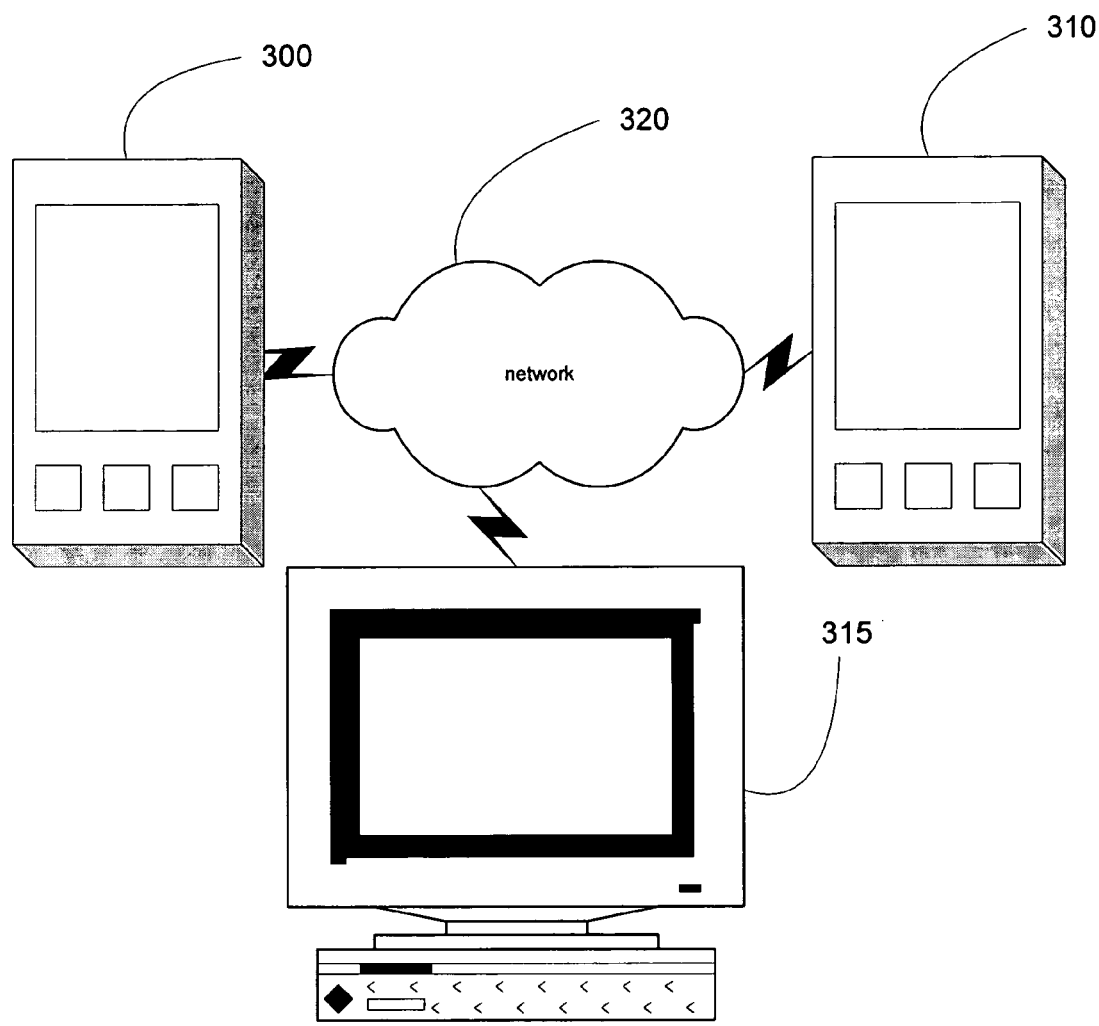
FIG. 8 is a diagram of a system in accordance with a preferred embodiment of the present invention.

The processes described above can be particularly useful in the area of real-time video communication related applications, such as mobile video conferencing over cell phones and portable electronic devices ("PDAs"). The processes are generally incorporated into encoders 10, such as that shown in FIG. 1a, and can be implemented in the form of an integrated circuit, firmware, or software. As illustrated in FIG. 8, the encoder 10 resides on a first electronic device, such a portable electronic device 300 enabled to distribute and transmit video data, particularly real-time video. A second or third electronic device, whether a computer 315, such as a server or workstation, or another portable electronic device 310, can access the first electronic device 300 via network 320, such as local area network, a wide area network, the Internet, or a wireless network. Likewise, the second and third electronic devices, 315 and 310, may also include an encoder 10 for two-way video communication. As mentioned above, there is no need to add or adapt any elements of the decoder for use with the encoder 10. This allows for heterogeneous network solutions.

In the foregoing specification, the invention has been described with reference to specific embodiments thereof. It will, however, be evident that various modifications and changes may be made thereto without departing from the broader spirit and scope of the invention. For example, this invention is particularly suited for applications involving video encoding applications, but can be applicable for other encoding applications. As a further example, each feature of one embodiment can be mixed and matched with other features shown in other embodiments. Additionally and obviously, features may be added or subtracted as desired. Accordingly, the invention is not to be restricted except in light of the attached claims and their equivalents.

What is claimed is:
1. A video communication system comprising:
a first electronic device operably couplable to a second electronic device enabled to receive and display video data, the first electronic device being configured to transmit video having a plurality of frames, each frame of the plurality of frames having a plurality of macroblocks, each macroblock having a plurality of pixels, and wherein the first electronic device includes a video encoder having a coding control sub-system configured to refresh a first segment of a first plurality of macroblocks of a first frame of the plurality of frames, refresh a second segment of a second plurality of macroblocks of a second frame of the plurality of frames, determine, by consulting a bitmap table, whether there are any of a plurality of macroblocks of a first segment of the second frame encoded with data from an unrefreshed macroblock of the first frame, and refresh the macroblocks of the first segment of the second frame that are marked to be refreshed;

wherein the bitmap table stores a status of each macroblock, and wherein the status of a macroblock is listed as to be refreshed when at least one pixel of the macroblock contains unrefreshed or contaminated data; and wherein a period of time, $M_b$, between the refresh of the first segment and a refresh of a last segment is determined as $M_b = N_c \times T / N_x$, where $N_c$ is a total number of macroblock segments in a frame of the plurality of frames, T is a time between two frames being refreshed, and $N_x$ is a number of segments being regularly refreshed in one frame; and wherein a number of intra-segments, $Col_{pgop}$, is determined as $Col_{pgop} = M \times \beta / N_c$, where M is a total number of macroblocks in one frame, and $\beta$ is a percentage of intra-macroblocks for the first frame.

2. The system of claim 1, wherein each of the first and second segments is a column of macroblocks within a frame and the refresh moves from left to right.

3. The system of claim 1, wherein each of the first and second segments includes two columns and the refresh moves from left to right.

4. The system of claim 1, further comprising a plurality of bitmap tables configured to keep the status of every pixel of a macroblock.

5. The system of claim 1, wherein each of the first and second segments is a row of macroblocks within a frame, and the refresh moves from top to bottom.

6. The system of claim 1, wherein the first electronic device is a portable electronic device.

7. The system of claim 1, wherein the second electronic device is communicatively accessible by the first electronic device.

8. The system of claim 1, wherein one of the first and second electronic devices is a computer.

9. The system of claim 1, wherein the sub-system is an integrated circuit.

10. The system of claim 1, wherein the encoder is implemented as an integrated circuit.

11. The system of claim 1, wherein the encoder includes a motion estimator and the sub-system determines whether there are macroblocks in the first segment encoded with data from an unrefreshed macroblock in the second segment by utilizing one or more motion vectors calculated by the motion estimator.

12. The system of claim 1, wherein a macroblock is 16×16 in size.

13. The system of claim 1, wherein a macroblock is 8×16 in size.

14. A method for refreshing a set of real-time video data having a plurality of frames, each frame of the plurality of frames having a plurality of macroblocks, to be transmitted by a first electronic device to a second electronic device, comprising the steps of:

receiving video data at a first electronic device comprising a video encoder, the video data having a plurality of frames wherein each frame of the plurality of frames having a plurality of macroblocks;

intra-coding a first segment of a first plurality of macroblocks of a first frame of the plurality of frames with the video encoder;

intra-coding a second segment of a second plurality of macroblocks of a second frame of the plurality of frames with the video encoder;

determining, by consulting a bitmap table, whether there is any unintra-coded data in a first segment of the plurality of macroblocks of the second frame;

intra-coding with the video encoder any of the plurality of macroblocks in the first segment of the second frame that have unintra-coded data; and transmitting the intra-coded video data from the first electronic device to a second electronic device enabled to receive and display the intra-coded video data;

wherein a period of time, $M_b$, between the refresh of the first segment and a refresh of a last segment is determined as $M_b = N_c \times T / N_x$, where $N_c$ is a total number of macroblock segments in a frame of the plurality of frames, T is a time between two frames being refreshed, and $N_x$ is a number of segments being regularly refreshed in one frame; and wherein a number of intra-segments, $Col_{pgop}$, is determined as $Col_{pgop} = M \times \beta / N_c$, where M is a total number of macroblocks in one frame, and $\beta$ is a percentage of intra-macroblocks for the first frame.

15. The method of claim 14, wherein the first and second segments are first and second columns, respectively.

16. The method of claim 15, wherein the step of intra-coding the plurality of macroblocks of the plurality of frames in columns progresses from left to right.

17. The method of claim 16, wherein the step of determining whether there is any unintra-coded data in the first column of the plurality of macroblocks includes utilizing one or more motion vectors related to the first column.

18. The method of claim 17, wherein the motion vectors are calculated by a motion estimator.

19. The method of claim 14, wherein a macroblock is 16×16 pixels in size.

20. The method of claim 14, wherein a macroblock is 8×8 pixels in size.

21. The method of claim 14, further comprising wirelessly transmitting the video data from the first electronic device to the second electronic device via a wireless network.

22. A video encoder configured to encode a set of video data having a plurality of frames, each frame of the plurality of frames having a plurality of macroblocks, said encoder comprising:

an input configured to receive the set of video data;

a motion estimator configured to calculate motion vectors; and a video refreshing system configured to refresh a first segment of a first plurality of macroblocks of a first frame of the plurality of frames, refresh a second segment of a second plurality of macroblocks of a second frame of the plurality of frames, determine whether there are any of a plurality of macroblocks of a first segment of the second frame encoded with data from an unrefreshed macroblock of the first frame via the calculated motion vectors, and refresh the macroblocks of the first segment of the second frame that are encoded with data from an unrefreshed macroblock of the first frame;

wherein a period of time, $M_b$, between the refresh of the first segment and a refresh of a last segment is determined as $M_b = N_c \times T/N_x$, where $N_c$ is a total number of macroblock segments in a frame of the plurality of frames, T is a time between two frames being refreshed, and $N_x$ is a number of segments being regularly refreshed in one frame; and wherein a number of intra-segments, $Col_{pgop}$, is determined as $Col_{pgop} = M \times \beta / N_c$, where M is a total number of macroblocks in one frame, and $\beta$ is a percentage of intra-macroblocks for the first frame.

23. The video encoder of claim 22, wherein each of the first and second segments is a column.

24. The video encoder of claim 23, wherein the refresh moves from left to right.

25. The video encoder of claim 22, wherein each of the first and second segments is a row.

26. The video encoder of claim 25, wherein the refresh moves from top to bottom.

27. The video encoder of claim 22, wherein the macroblock is 8×8 pixels in size.

28. The system of claim 1, wherein the system includes a quality feedback framework.

29. The method of claim 14 further comprising the step of comparing the video data before it has been refreshed with the refreshed video data.

30. The method of claim 29, wherein the refresh rate is a function of the comparison between the video data before it has been refreshed and the refreshed video data to be sent to the second electronic device.

31. The method of claim 30, wherein the comparing step includes comparing the quality features of processed spatial-temporal regions.

32. The system of claim 28, wherein the quality feedback framework includes:
  a first feature extraction component enabled to receive video data;
  a second feature extraction component coupled to the encoder; and
  a quality evaluation component coupled to the first and second feature extraction components.

33. The system of claim 1, wherein the first and second frames are separated by at least one frame.

* * * * *